United States Patent [19]

Thompson

[11] 3,738,425

[45] June 12, 1973

[54] STABILIZATION OF WATER SENSITIVE CLAYS

[75] Inventor: James L. Thompson, Tulsa, Okla.

[73] Assignee: The Dow Chemical Company, Midland, Mich.

[22] Filed: Aug. 4, 1971

[21] Appl. No.: 169,121

[52] U.S. Cl. .............................. 166/305 R, 61/35 R
[51] Int. Cl. ............................................ E21b 33/13
[58] Field of Search ..................... 166/305 R; 61/35

[56] References Cited
UNITED STATES PATENTS

| | | | |
|---|---|---|---|
| 2,379,561 | 11/1941 | Bennett | 166/305 R |
| 3,444,931 | 5/1969 | Braden, Jr. | 166/305 R |

*Primary Examiner*—Marvin A. Champion
*Assistant Examiner*—Jack E. Ebel
*Attorney*—Bruce M. Kanuch, Lloyd S. Jowanovitz

[57] ABSTRACT

A method of treating a formation (e.g., subterranean), containing water sensitive clay minerals is provided. In this method, the formation is first treated with alcohol which will not appreciably swell or disperse the clay mineral. The formation is then contacted with phosphoric acid or phosphorous pentoxide, dispersed in a similar alcohol for a sufficient period of time to stabilize the clay mineral.

7 Claims, No Drawings

STABILIZATION OF WATER SENSITIVE CLAYS

BACKGROUND OF THE INVENTION

Many techniques have been devised for stabilizing water-sensitive formations containing clay minerals. In general, it may be desired to either increase the load bearing capacity of a formation and/or to maintain a certain degree of permeability therein. In the former, it is not always necessary that the formation retain its permeability and thus certain chemical stabilizers dispersed in an aqueous medium can be employed. For example, it is taught by Michaels, Williams and Randolph, Industrial and Engineering Chemistry, "Acidic Phosphorous Compounds as Soil Stabilizers," Vol. 50, No. 6, pp 889-893, that an aqueous solution of phosphoric acid can be employed to solidify and increase the load bearing capacity of clayey soils. In this method, the clay particles are actually cemented together. The above method, however, cannot be employed to stabilize clayey formations where it is desired to maintain a high degree of permeability, e.g., in oil and gas wells. Several methods have been discovered for permeability stabilizing some clayey soils. However, known techniques are not successful on all types of clayey formations.

The present method can be employed to permeably stabilize (prevent dispersing or swelling) certain clayey soils which are highly sensitive to aqueous based stabilizing chemicals.

DESCRIPTION OF THE INVENTION

A formation containing water sensitive clay minerals is first contacted with a sufficient quantity of an alcohol which will not appreciably disperse or swell the particular clay minerals in the formation, to remove aqueous based fluids from an area which is to be stabilized. Following this the same area is contacted with a similar alcohol having dispersed therein phosphoric acid or phosphorous pentoxide. The formation is allowed to soak for a period of time and the alcohol mixture is then removed with an overflush of, for example, water, brine or the like.

Specific alcohols which have been found to be useful in a formation containing one or more clay minerals, e.g., kaolinite, illite, montmorillonite, feldspar and/or chlorites, is methyl, ethyl alcohol or a mixture thereof. On the other hand, unexplainably isopropyl alcohol caused the clay in the formation to be dispersed.

The phosphoric acid or phosphorous pentoxide is employed in methyl or ethyl alcohol or mixture thereof in an amount ranging from about 2 to 10 per cent by weight, preferably 4 to 6 per cent by weight of the alcohol carrier.

The formation is flushed with from about 120 to 250 gallons of alcohol per foot of formation to be treated and soaked with about an equivalent amount of the alcohol dispersion.

The alcohol dispersion of phosphoric acid or phosphorous pentoxide is allowed to remain in contact with the formation for a sufficient period of time to permeably stabilize the clay minerals in the formation. The soaking time will depend on such factors as the amount of constituents in the formation, formation temperature strength of alcohol dispersion and the like.

The alcohol or mixture which is most efficacious on any particular formation containing water sensitive clay mineral and the optimum soaking period can be readily determined by running simple laboratory tests on sample cores taken from the formation to be treated. Illustrative of such tests are those described in the following examples.

EXAMPLE 1

Certain oil wells located in Louisiana pass through a Miocene formation "S" zone. The zone was causing considerable difficulty since it was damaged, i.e., clay minerals were dispersed or swelled, by its own produced fluids. The zone could not be stabilized with zirconium oxychloride, a known clay swelling control agent (U. S. Pat. No. 3,382,924). X-Ray diffraction analysis of sample cores showed the formation to contain a major proportion of quartz and a minor proportion (less than 15 per cent) of a mixture of kaolinite, illite, montmorillonite, feldspar and chlorite minerals.

The following tests were run on frozen core samples taken from the formation.

For these tests, 1 inch O.D. × 1½ inch long core plugs were used. The core plugs were drilled from a frozen "S" sand core using liquid nitrogen. The frozen core plugs were placed in a core holder with a Hassler sleeve pressure of 500 psi and the temperature of the core was increased to about 165°F, the temperature of the reservoir from which it was taken. Permeability measurements were obtained by metering certain fluids through the core at a constant flow rate for volumetric measurements at the outlet of the core and the pressure differential across the core was measured with a Wiancho pressure transducer and indicator. Certain fluids were passed through the core at the reservoir temperature in the sequence indicated below in Table I.

TABLE I

| Core | Fluid | Permeability (md) |
|---|---|---|
| 1 | Kerosene | 166 |
|   | Isopropanol | 136 |
|   | Formation Brine | 49 |
| 2 | Kerosene | 145 |
|   | Isopropanol | 79 |
|   | Formation Brine | 29 |
| 3 | Kerosene | 149 |
|   | Isopropanol | 42 |
|   | Formation Brine | 61 |

Kerosene was used to establish the permeability of the core to an inert, non-damaging fluid. Isopropanol is miscible with the core test fluid and essentially complete displacement of the core test fluid was obtained. Isopropanol is also miscible with the formation brine and was essentially displaced by that fluid. This permitted the measurement of the specific permeability of the core with each test fluid and the data showed the effect of each fluid on the permeability of the core. These data show that the "S" sand was damaged by the injection of the formation brine. Also, these data indicated isopropanol caused formation damage.

Formation damage with isopropanol is rather unusual because it is generally considered to be an inert fluid to reservoir rock systems. Additional tests were performed to confirm the fluid flow data obtained with isopropanol. The test procedure consisted of adding five grams of sand core material into a 25 ml graduated cylinder containing a certain fluid. The cylinder was stoppered and shaken until sand was evenly suspended. The system was allowed to stand quiescent for one hour. Then the volume of settled solids was measured and a description of the dispersion of solids in the test fluids was recorded. The same measurements and observations were obtained after the system was allowed to stand quiescent for 24 hours. The test fluids used in these tests were distilled water, formation brine, kerosene, and isopropanol. Distilled water was used in these tests to provide a reference fluid which would cause formation damage. The following data was obtained with these tests.

TABLE II

| Sample Number | Test fluid | Original volume of dry sand, ml. | Results after one hour settling | | Results after 24 hours settling | |
|---|---|---|---|---|---|---|
| | | | Volume of solid, ml. | Description of dispersion | Volume of solid, ml. | Description of liquid |
| 1 | Distilled water | 3.3 | (¹) | Heavy | 7.0 | Milky. |
| 2 | Formation water | 3.2 | 4.4 | Medium | 4.1 | Clear. |
| 3 | Kerosene | 3.3 | 3.8 | Clear | 4.0 | Do. |
| 4 | Isopropanol | 3.3 | 3.8 | Light | 4.0 | Do. |

¹ Not settled.

The data indicate that the formation brine and isopropanol react with particles in the sand. However, the reaction was considerably less with these fluids than with the distilled water. The amount of particles dispersed in the various fluids after one hour of settling suggests that the following fluids would cause formation damage and the amount of damage caused by the fluids would decrease in the order as they are listed: (1) distilled water; (2) formation brine; and (3) isopropanol. The data also indicate that kerosene would be an inert fluid for the sand.

These tests were designed only for semiquantitatively examination of the reaction of the fluids with the "S" sand; however, the data appear to agree with the formation sensitivity data generated in the first part (Table I) of Example 1. The fluid flow and fluid reaction data indicate that the sand contained water-sensitive particles and that isopropanol should not be used as a solvent for any preflush and afterflush treatments.

EXAMPLE 2

In this example, a test procedure was used to screen chemical solutions for their ability to minimize or prevent formation damage with the formation brine. The first step of the test procedure was the same as used in the dispersion and settling tests using distilled water, kerosene, isopropanol, and formation brine set forth in Example 1. The following results were obtained with the chemical solution treatments:

Therefore, these data suggested that the four chemical solutions listed above should not cause formation damage during a fluid flow test.

The second step in the chemical solution reaction test was to remove the chemical solution from the graduated cylinder and add 20 ml of formation brine. The graduated cylinder was stoppered and shaken until the sand particles were evenly suspended. The system was allowed to stand quiescent for 2 hours before the reading and observations were taken. The following results were obtained:

TABLE IV

| Sample Number | Chemical Solution Treatment | Chemical Solution Removed and "S" Sand was Agitated with Formation Brine and Allowed to Settle for Two Hours | | |
|---|---|---|---|---|
| | | Volume of Solid ml | Description of Liquid | Presence of Jel Layer on Sand |
| 1 | Formation brine with 3% KCl | 4.5 | Slightly milky | Yes |
| 2 | Formation brine with 5% by volume zirconium oxychloride | 4.0 | Slightly milky | Yes |
| 3 | Methanol with 5% by volume of zirconium oxychloride | 4.5 | Milky | Yes |
| 4 | Methanol with 5% $H_3PO_4$ | 4.7 | Clear | No |
| 5 | Methanol with 10% $H_3PO_4$ | 4.4 | Clear | No |
| 6 | Methanol with 2% NaOH | 7.3 | Clear | Yes |
| 7 | Diesel π1 with 10% by volume of butylether of ethylene glycol | 7.3 | Clear | Yes |
| 8 | Isopropyl alcohol with 20% $NH_4OH$ | 4.4 | Clear | Yes |

These data indicate that methanol with 2 per cent NaOH should not be used in a chemical treatment of the sand. The data also indicate that methanol with 5

TABLE III

| Sample number | Chemical solution treatment | Original volume of dry "S" sand, ml. | Results after one hour settling | | Results after 24 hours settling | |
|---|---|---|---|---|---|---|
| | | | Volume of solid, ml. | Description of dispersion | Volume of solid, ml. | Description of liquid |
| 1 | Formation brine with 3% KCl | 3.2 | 4.4 | Medium light | 4.4 | Clear. |
| 2 | Formation brine with 5% by volume of zirconium oxychloride | 3.2 | 4.0 | Medium | 3.8 | Do. |
| 3 | Methanol with 5% by volume of zirconium oxychloride | 3.4 | 4.2 | Medium light | 4.2 | Light yellow. |
| 4 | Methanol with 5% $H_3PO_4$ | 3.8 | 4.2 | Light | 4.2 | Clear. |
| 5 | Methanol with 10% $H_3PO_4$ | 3.6 | 4.0 | ...do | 4.2 | Do. |
| 6 | Methanol with 2% NaOH | 4.0 | 4.4 | Medium light | 4.2 | Do. |
| 7 | Diesel #1 with 10% by volume of butylene of ethylene glycol | 3.2 | 4.0 | None | 3.8 | Do. |
| 8 | Isopropyl alcohol with 20% $NH_4OH$ | 3.2 | 4.4 | Light | 4.3 | Do. |

The dispersion data obtained for 1 hour settling time with the various chemical solutions indicate that methanol with 5 per cent and 10 per cent $H_3PO_4$, diesel with 10 per cent by volume of butyl ether of ethylene glycol and isopropyl alcohol with 20 per cent by volume of $NH_4OH$ resulted in the smallest amount of dispersion. The description of the various chemical solutions after 24 hours settling time was about the same. The volumes of the settled solid particles were somewhat similar.

per cent and 10 per cent $H_3PO_4$, diesel No. 1 with butyl ether of ethylene glycol and methanol with zirconium oxychloride treating fluids might be good stabilizing chemicals for the sand.

EXAMPLE 3

The experimental procedure used in these tests was the same as given in the first test procedure described in Example 1. The fluids passed through the core in the sequence indicated.

TABLE V

| Test | Fluid | Permeability (md) |
|---|---|---|
| Test 1 | Methanol | 147 |
| | Methanol with 5% $H_3PO_4$ | 184 |
| | Formation Brine | 46 |
| Test 2 | Methanol | 73 |
| | Methanol with 5% by volume of zirconium oxychloride | 86 |
| | Formation Brine | 17 |
| Test 3 | Methanol | 139 |
| | Diesel No. 1 with 10% by volume of butyl ether of ethylene glycol | 130 |
| | Formation Brine | 49 |

Other chemical solutions were tested including 15 per cent HCl containing 5 per cent and 10 per cent by volume of zirconium oxychloride, diesel No. 1 with several surfactants, glacial acetic acid, alcohol with 20 per cent by volume of $NH_4OH$, methanol with a combination of 5 per cent $H_3PO_4$ and 2 per cent by volume of oxtylamine, formation brine with 5 per cent by volume of zirconium oxychloride, and formation brine with 3 per cent KCl. The data from these latter fluid flow tests showed that these solutions were not effective as a clay stabilizing chemical for the "S" sand.

Additional tests were then performed to further evaluate methanol with 5 per cent $H_3PO_4$ as a stabilizing agent. The experimental procedure was changed so that the core system was allowed to stand at least 20 hours after the methanol-5 per cent $H_3PO_4$ treatment and then the formation brine permeability test was performed. The following results were obtained:

TABLE VI

| Test | Fluid | Permeability (md) |
|---|---|---|
| Test 1 | Methanol | 35 |
| | Methanol with 5% $H_3PO_4$ (Then core was allowed to stand 20 hours under pressure and at reservoir temperature) | 45 |
| | Formation Brine | 49 |
| Test 2 | Methanol | 118 |
| | Methanol with 5% $H_3PO_4$ (Standing 20 hours) | 140 |
| | Formation Brine | 286 |

These data show that a methanol with 5 per cent $H_3PO_4$ chemical injection and 20 hours of cure time will stabilize the sand for formation brine injection. Another test was performed using 10 per cent $H_3PO_4$ and the results confirmed the data obtained in Tests 1 and 2, Table VI. Therefore, additional tests were performed to evaluate the methanol with 5 per cent $H_3PO_4$ treatment for a simulated workover operation.

A series of fluid flow tests were performed to evaluate the methanol-$H_3PO_4$ treatment followed by a workover operation. The additional fluid flow tests after the methanol-$H_3PO_4$ treatment were: 9.6 lb/gal NaCl solution, 15 per cent HCl and a reverse flow test of the formation brine. The following results were obtained:

TABLE VII

| Test | Fluid | Permeability (md) |
|---|---|---|
| Test 1 | Methanol | 144 |
| | Methanol with 5% $H_3PO_4$ (Standing 20 hours) | 91 |
| | Formation Brine | 78 |
| | 9.6 lb/gal NaCl Solution | 92 |
| | 15% HCl | 86 |
| | Reverse flow of formation brine | 74 |
| Test 2 | Methanol | 66 |
| | Methanol with 5% $H_3PO_4$ (Standing 20 hours) | 72 |
| | Formation Brine | 154 |
| | 9.6 lb/gal NaCl Solution | 110 |
| | 15% HCl | 100 |
| | Reverse flow of formation brine | 89 |

These data indicate that the preflush of the methanol, the chemical treatment of methanol with 5 per cent $H_3PO_4$ and a 20 hour cure time was successful in stabilizing the sand for a subsequent workover operation and re-establishing the previous production rates.

Similarly, treatments with phosphoric acid or phosphorous pentoxide dispersed in an alcohol, e.g., ethyl alcohol, which will not appreciably swell or disperse certain clayey soils and sands is successful.

What is claimed is:

1. A method of permeably stabilizing a formation containing water sensitive clay minerals which comprises:
   a. contacting the area of the formation to be stabilized with a sufficient amount of an alcohol, which will not appreciably swell or disperse said clay minerals, to remove a substantial amount of water contained therein; and
   b. following said contact with said alcohol, soaking said formation with an alcohol solution of phosphoric acid, said alcohol being one which will not swell or disperse said clay minerals.

2. The method of claim 1 wherein the first and second alcohols are at least one of methyl or ethyl alcohol.

3. The method of claim 1 wherein the area to be stabilizing is contacted and soaked with from about 120 to 250 gallons of alcohol and alcohol solution per foot of formation to be stabilized.

4. The method of claim 1 wherein the contacting alcohol and soaking alcohol is methyl alcohol.

5. The method of claim 4 wherein the formation is subterranean and located adjacent to a wellbore.

6. The method of claim 1 including in addition the step of removing spent alcohol solution of phosphoric acid from the formation.

7. The method of claim 1 wherein the formation is subterranean and located adjacent to a wellbore.

* * * * *

UNITED STATES PATENT OFFICE
CERTIFICATE OF CORRECTION

Patent No. 3,738,425      Dated June 12, 1973

Inventor(s) James L. Thompson

It is certified that error appears in the above-identified patent and that said Letters Patent are hereby corrected as shown below:

Column 4, Table IV, Sample No. 7, column 2, delete "π 1" and insert --# 1--.

Column 4, Table IV, Sample No. 7, column 3, delete "7.3" and insert --5.8--.

Signed and sealed this 12th day of March 1974.

(SEAL)
Attest:

EDWARD M. FLETCHER, JR.
Attesting Officer

C. MARSHALL DANN
Commissioner of Patents